(12) United States Patent
Collins

(10) Patent No.: US 7,565,764 B2
(45) Date of Patent: *Jul. 28, 2009

(54) INSECT COLLECTOR AND VIEWER

(76) Inventor: Michael R. Collins, 25 Chesterfield Rd., Bedford, NH (US) 03110

( * ) Notice: Subject to any disclaimer, the term of this patent is extended or adjusted under 35 U.S.C. 154(b) by 0 days.

This patent is subject to a terminal disclaimer.

(21) Appl. No.: 12/044,098

(22) Filed: Mar. 7, 2008

(65) Prior Publication Data

US 2008/0148625 A1 Jun. 26, 2008

Related U.S. Application Data

(63) Continuation of application No. 11/541,384, filed on Sep. 28, 2006, now Pat. No. 7,404,269.

(60) Provisional application No. 60/721,273, filed on Sep. 28, 2005.

(51) Int. Cl.
*A01M 1/06* (2006.01)
(52) U.S. Cl. ........................................................ 43/139
(58) Field of Classification Search .................... 43/139
See application file for complete search history.

(56) References Cited

U.S. PATENT DOCUMENTS

| | | | | |
|---|---|---|---|---|
| 289,997 | A * | 12/1883 | De Luze | 43/139 |
| 454,720 | A * | 6/1891 | Dexter | 43/139 |
| 738,184 | A * | 9/1903 | Goodwin | 43/139 |
| 923,368 | A * | 6/1909 | Myser | 43/139 |
| 959,155 | A * | 5/1910 | Nault | 43/139 |
| 993,644 | A * | 5/1911 | Brisbane | 43/139 |
| 1,071,620 | A * | 8/1913 | Kingsland | 43/139 |
| 1,141,039 | A * | 5/1915 | Cox | 43/139 |
| 1,158,542 | A * | 11/1915 | Noonan | 43/139 |
| 1,308,497 | A * | 7/1919 | Jolly | 43/139 |
| 1,752,778 | A * | 4/1930 | Brown et al. | 43/139 |
| 1,797,557 | A * | 3/1931 | Stine et al. | 43/139 |
| 1,807,550 | A * | 5/1931 | Rector | 43/139 |
| 1,819,551 | A * | 8/1931 | Gourdon | 43/139 |
| 2,384,930 | A * | 9/1945 | Kendrick | 43/139 |
| 2,567,616 | A * | 9/1951 | Moore | 43/139 |

(Continued)

FOREIGN PATENT DOCUMENTS

DE 3225330 A * 1/1984

(Continued)

*Primary Examiner*—Darren W Ark
(74) *Attorney, Agent, or Firm*—Hayes Soloway P.C.

(57) ABSTRACT

The invention is directed to an insect collection and viewing device comprising a negative air pressure generating assembly including a motor and a fan driven by the motor and a suitably shaped collection nozzle. A viewing chamber is coupled intermediate the collection nozzle and the negative air pressure assembly. The viewing chamber is tubular in shape and has an air permeable-insect impermeable screen at the downstream opening thereof and a movable valve/lens at the upstream opening thereof. When the valve/lens is open an air flow is established through the device. The air flow path is from the nozzle through the viewing chamber into and out of the assembly. In operation insects of interest are captured by sucking the insect into the device through the nozzle, then through the open valve/lens into the viewing chamber where it is captured between the screen and the closed valve. By making the valve in the shape of a transparent lens the trapped insect may be inspected through the magnifying lens.

9 Claims, 3 Drawing Sheets

U.S. PATENT DOCUMENTS

| | | | | | |
|---|---|---|---|---|---|
| 2,569,722 | A | * | 10/1951 | Knox | 43/139 |
| 2,806,321 | A | * | 9/1957 | Blackman | 43/139 |
| 2,829,384 | A | * | 4/1958 | Studler | 43/139 |
| 2,879,620 | A | * | 3/1959 | McGinnis | 43/139 |
| 2,992,770 | A | * | 7/1961 | Keiser | 43/139 |
| 3,214,861 | A | * | 11/1965 | Arther | 43/139 |
| 3,231,997 | A | * | 2/1966 | Shugarman | 43/139 |
| 3,330,063 | A | * | 7/1967 | Lockwood | 43/139 |
| 3,711,987 | A | * | 1/1973 | Fisk | 43/139 |
| 3,750,327 | A | * | 8/1973 | Thybault | 43/139 |
| 3,796,001 | A | * | 3/1974 | Jackson | 43/139 |
| 3,965,608 | A | * | 6/1976 | Schuman | 43/139 |
| 4,074,458 | A | * | 2/1978 | Catlett | 43/139 |
| 4,106,438 | A | * | 8/1978 | Nelson | 43/139 |
| 4,141,174 | A | * | 2/1979 | Smith | 43/139 |
| 4,175,352 | A | * | 11/1979 | Catlett | 43/139 |
| 4,279,095 | A | * | 7/1981 | Aasen | 43/139 |
| 4,449,319 | A | * | 5/1984 | Garcia | 43/139 |
| 4,488,331 | A | * | 12/1984 | Ward | 43/139 |
| 4,602,846 | A | * | 7/1986 | Karnes | 15/105 |
| 4,607,451 | A | * | 8/1986 | Jarecki | 43/139 |
| 4,614,003 | A | * | 9/1986 | Martin | 15/339 |
| 4,631,858 | A | * | 12/1986 | Kahle | 43/139 |
| 4,733,495 | A | * | 3/1988 | Winnicki | 43/139 |
| 4,780,986 | A | * | 11/1988 | Broomfield et al. | 43/139 |
| 4,794,725 | A | * | 1/1989 | Numerick | 43/139 |
| 4,817,330 | A | * | 4/1989 | Fahringer | 43/139 |
| 4,858,376 | A | * | 8/1989 | Reed | 43/139 |
| 4,918,857 | A | * | 4/1990 | Wade et al. | 43/139 |
| 4,927,284 | A | * | 5/1990 | Tsai | 15/214 |
| 4,979,330 | A | * | 12/1990 | Rorant | 43/139 |
| 5,052,147 | A | * | 10/1991 | Broomfield et al. | 43/139 |
| 5,106,492 | A | * | 4/1992 | Distinti et al. | 15/1.7 |
| 5,175,960 | A | * | 1/1993 | Wade et al. | 43/139 |
| 5,195,209 | A | * | 3/1993 | Watkins | 15/339 |
| 5,222,322 | A | * | 6/1993 | Mastromonaco | 43/139 |
| 5,305,495 | A | * | 4/1994 | Nelsen et al. | 43/139 |
| 5,333,342 | A | * | 8/1994 | Huang | 15/105 |
| 5,367,821 | A | * | 11/1994 | Ott | 43/139 |
| 5,402,598 | A | * | 4/1995 | Wade et al. | 43/139 |
| 5,618,289 | A | * | 4/1997 | Aragona et al. | 15/105 |
| 5,655,253 | A | * | 8/1997 | Nevin et al. | 15/339 |
| 5,768,748 | A | * | 6/1998 | Silvera et al. | 15/339 |
| 5,915,950 | A | * | 6/1999 | Kleinhenz | 43/139 |
| 6,086,682 | A | * | 7/2000 | Anderson | 15/402 |
| 6,202,343 | B1 | * | 3/2001 | Mah | 43/139 |
| 6,226,919 | B1 | * | 5/2001 | Septer | 43/139 |
| 6,568,125 | B2 | * | 5/2003 | Kleinhenz | 43/139 |
| 6,640,489 | B1 | * | 11/2003 | Boulton | 43/139 |
| 6,651,380 | B2 | * | 11/2003 | Wyers | 43/139 |
| 6,817,139 | B1 | * | 11/2004 | Powell et al. | 43/139 |
| 7,152,365 | B2 | * | 12/2006 | Wyers | 43/139 |
| 7,404,269 | B2 | * | 7/2008 | Collins | 43/139 |
| 2005/0246944 | A1 | * | 11/2005 | Flowers | 43/139 |
| 2005/0246945 | A1 | * | 11/2005 | Evink | 43/139 |
| 2006/0218851 | A1 | * | 10/2006 | Weiss et al. | 43/139 |
| 2007/0074447 | A1 | * | 4/2007 | Kalogroulis | 43/139 |

FOREIGN PATENT DOCUMENTS

| | | | |
|---|---|---|---|
| DE | 4112266 | C1 * | 5/1992 |
| DE | 4327150 | A1 * | 2/1995 |
| DE | 1006058992 | A1 * | 7/2007 |
| EP | 129504 | A1 * | 12/1984 |
| EP | 941660 | A1 * | 9/1999 |
| EP | 1040756 | A1 * | 10/2000 |
| GB | 2236467 | A * | 4/1991 |
| GB | 2351645 | A * | 1/2001 |
| JP | 2001025344 | A * | 1/2001 |
| JP | 2004337019 | A * | 12/2004 |
| SU | 1644858 | A * | 4/1991 |
| WO | WO 9207461 | A * | 5/1992 |
| WO | WO 2004060057 | A1 * | 7/2004 |

\* cited by examiner

INSECT COLLECTOR AND VIEWER

CROSS REFERENCE TO RELATED APPLICATION

This application is a continuation application of U.S. application Ser. No. 11/541,384 filed Sep. 28, 2006 now U. S. Pat. No. 7,404,269.

This application claims the benefit of Provisional Patent Application Ser. No. 60/721,273 filed Sep. 28, 2005, the disclosure of which is incorporated in its entirety hereinto by reference.

BACKGROUND OF THE INVENTION

This invention pertains to a vacuum operated insect collection and viewing device. In particular, the arrangement of the invention is designed to make it easy for children and others having an interest to explore their natural curiosity about insects, without touching or killing them and with comparative safety from being bitten or stung by them.

The prior art has many examples of devices which develop a vacuum for the purpose of trapping, collecting and disposing of insects. Insects such as flies, mosquitoes, beetles, spiders have long been considered pests and marked for destruction. Flying insects are considered a particular nuisance, especially when present in the home, dining or food handling establishments For many years it has been commonplace to use sprays, fly swatters, fly paper, insecticides and various other remedies to deal with unwanted insects.

There are known devices that are operated by a vacuum to capture insects and deposit them in a bag or some other cleanable collection element for later disposal. Such devices normally use an elongated funnel of some sort which is put under a negative pressure, and brought near enough to the insect for the insect to be suctioned into the funnel and then into a bag or other container to be subsequently disposed of at a later time.

While some components of the invention are common to arrangements in the prior art, the purpose of the invention is, in essence, quite distinct from the purpose of the aforementioned prior art devices. The object of the invention is not to kill the insect being captured but rather to afford an opportunity to examine, study and investigate the physical makeup of the insect of interest. In this regard, it has particular utility for those studying insects, and an innate usefulness as a toy or educational device for children who have an natural inclination to capture and observe insects. The invention provides provides just such opportunity to capture insects without harming them. It furthermore provides a means to capture and study insects without touching them and with ease and a high degree of safety from insect bites. Even dangerous stinging insects can be handled and studied using the device with a general avoidance of fear in the process.

BRIEF SUMMARY OF THE INVENTION

The above purposes are achieved in a live insect capture and viewing arrangement intended to allow safe and easy capture, viewing and examination of insects. The arrangement comprises a negative air pressure generating assembly including a motor and a fan driven by the motor and a suitably shaped collection nozzle. A viewing chamber is coupled intermediate the collection nozzle and the negative air pressure generating assembly. The viewing chamber is tubular in shape and has an air permeable, insect impermeable screen at the downstream opening thereof and a movable valve at the upstream opening thereof. When the valve is open, an air flow is established through the device. The air flow path is from the nozzle through the viewing chamber into and out of the vacuum generating assembly. The valve may be in the form of a rotatable lens that permits examination of insects captured in the viewing chamber. In operation, insects of interest are captured by sucking the insect into the device through the nozzle, then through the open valve/lens into the viewing chamber where it is captured between the screen and the closed valve.

BRIEF DESCRIPTION OF THE DRAWINGS

A complete understanding of the present invention will be had by reference to the accompanying drawings, when considered in conjunction with the subsequent, detailed description in which.

DETAILED DESCRIPTION OF THE INVENTION

Figure 1:
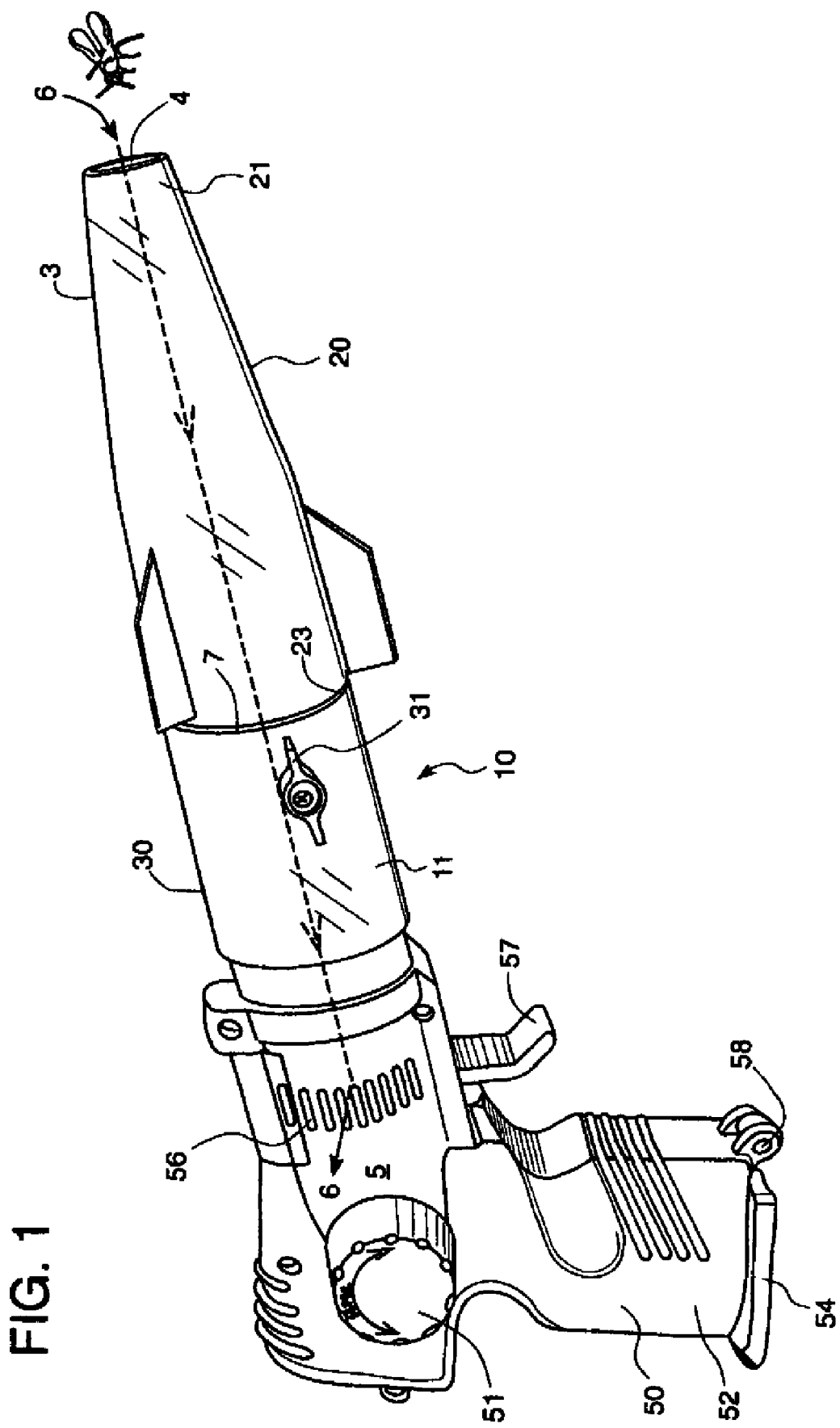
FIG. 1 is a perspective view of the exterior of the insect collector and viewing arrangement of the invention.
Figure 2:
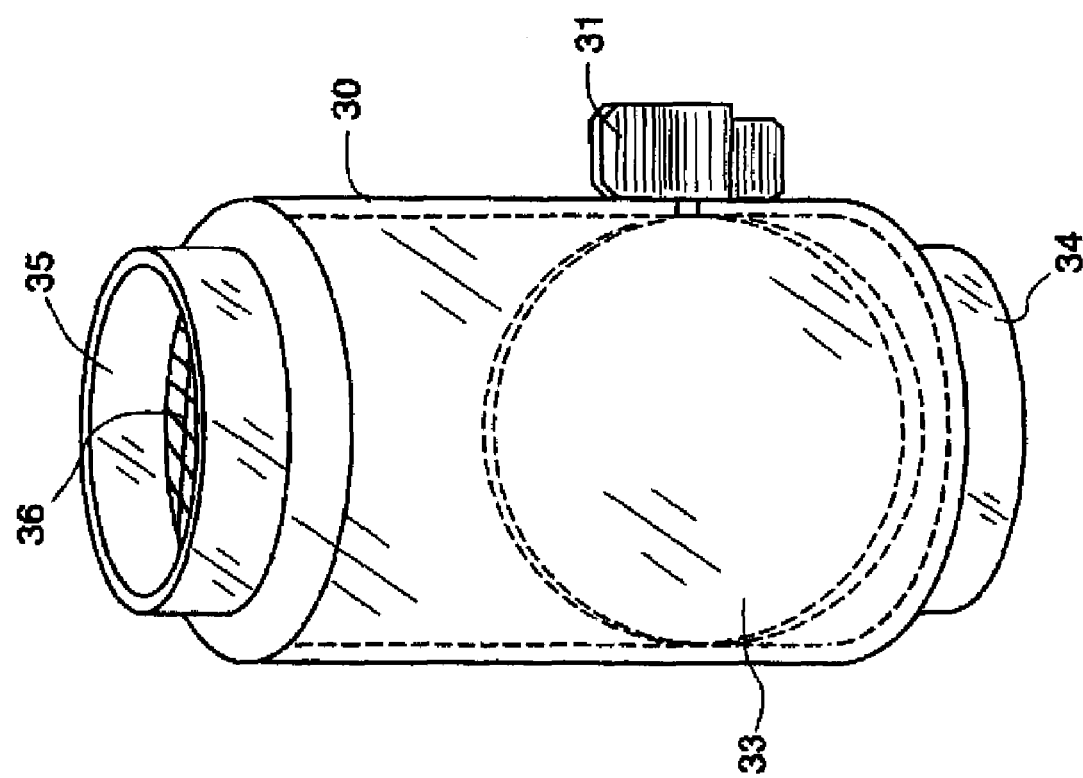
FIG. 2 is a perspective view of the transparent viewing chamber and rotatable valve/lens.
Figure 3:
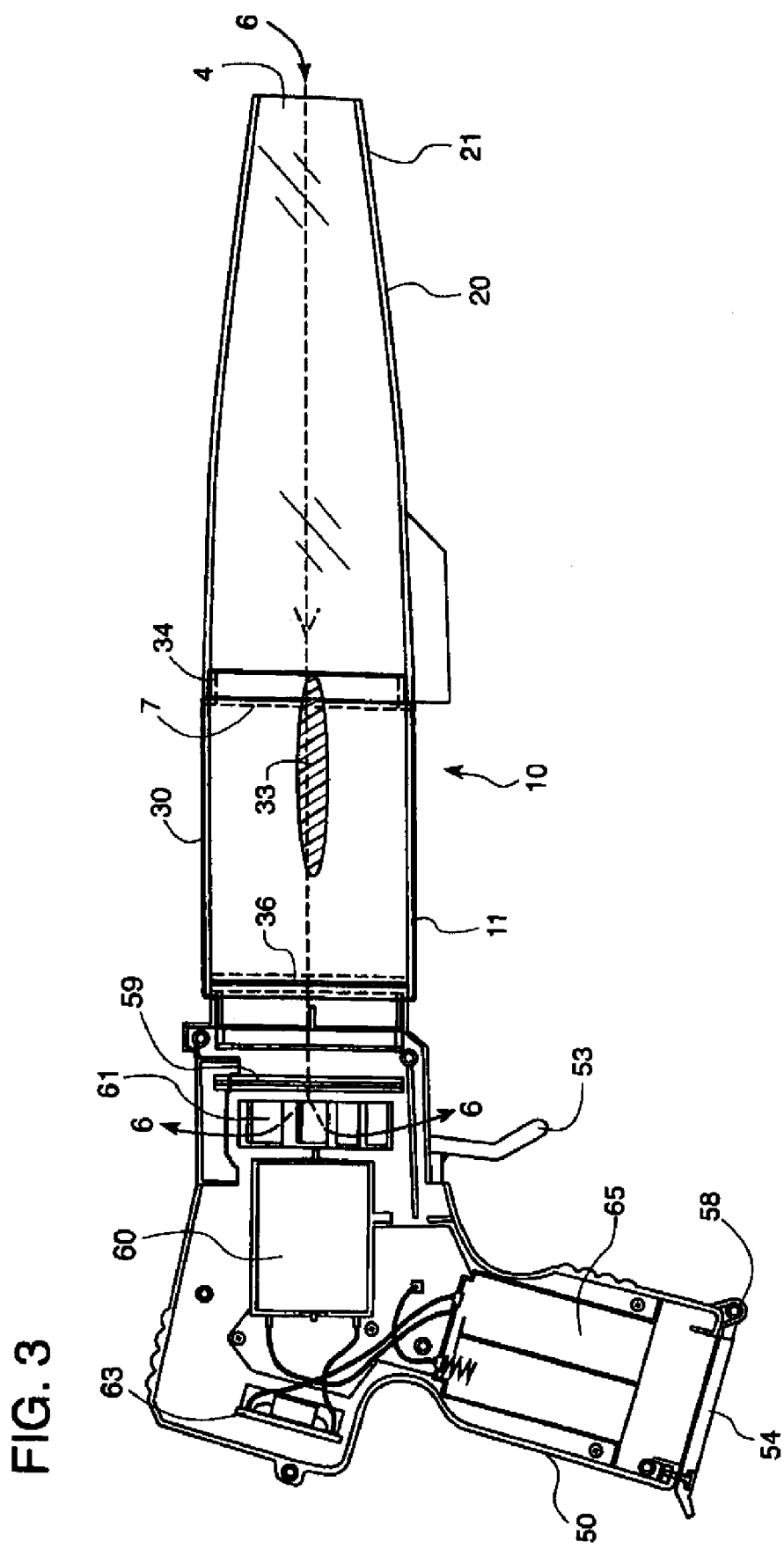
FIG. 3 is a sectional side elevation view of the insect collection and viewing device

As seen from the several views, the insect collection and viewing arrangement 10 of the invention generally takes the overall form of a battery powered pistol or gun. The arrangement 10 comprises a housing 11 formed of three main components; a nozzle 20, a viewing chamber 30 and a fan assembly 50. The above three components are coupled together from a front or upstream end 3 to a rear or downstream end 5 to form a continuous air flow path 6 from the front to the rear of the device.

The nozzle 20 may take one of many possible generally tubular shapes characterized by an intake opening 4 at the front, a generally cylindrical cross section throughout and a rear opening 7. The intake opening 4 functions to capture insects, as illustrated. The size and shape of the intake opening 4 is selected to be appropriate for the size and shape of the insect to be captured. Thus, for catching small insects a correspondingly small opening 4 would be used, while for catching a relatively large insect, such as a butterfly, a correspondingly large opening 4 would be provided.

The rear opening 7 of the nozzle may be selectively attached to or detached from the front of the viewing chamber 30 and has suitable formations thereon for this purpose. One of the many standard mechanical quick-connect coupling arrangements or alternatively a simple friction fit between parts may be utilized for this purpose.

The viewing chamber 30 couples the nozzle 3 to the fan assembly 50, has a generally cylindrical cross section and is made of a transparent material to allow viewing of its interior. The chamber has a combination valve/magnifying lens 33 near the upstream end thereof and mounted for rotation from radially opposite walls portions of the chamber near the upstream end thereof. The combination valve/lens 33 is rotatable in its mounting by a manually operated handle 31 connected to the valve/lens by a shaft mounted in the wall of the chamber. The diameter of the lens is selected to be only slightly smaller than the inside diameter of the viewing chamber. The downstream end of the viewing chamber has a screen 36 to prevent insects or other items from being drawn into the rotating fan. Because of the screen 36 insects sucked into the viewing chamber thru the front opening in the chamber are not able to escape from the rear of the chamber. In addition, the screen prevents other small particles from being drawn into the rotating fan. The valve/lens may be rotated to a position perpendicular to the axis of the viewing chamber in which position it substantially limits or cuts off the airflow 6 and blocks insects from entering or exiting the viewing chamber. The valve/lens 33 may be rotated by using the handle 31 to a position parallel with the axis of the viewing chamber. In this position it creates a maximum opening at the front or the upstream side of the chamber and thereby permits a maximum flow of air into the housing through the opening of the nozzle and also presents a minimum impediment to insects of interest to be sucked into the viewing chamber, as will be appreciated from the remainder of the description. The valve/lens is preferably standard in construction and operates to a dual purpose when in its closed position. In its closed position it operates to provide a magnified view of the interior of the viewing chamber and any captured insects which have entered the chamber. In its closed position it also functions as a valve or gate to close off the front of the chamber to thereby prevent additional objects (including insects) from entering through the front of the chamber. Detents are suitably placed on the lens or the inside of the chamber to hold it in the closed and open positions.

The fan assembly 50 is located at the rear of the device and contained in the rear portion 52 of the housing 11 that is generally in the shape of the pistol grip and trigger portions of a standard pistol. The rear portion 52 of the housing is selectively attachable to and detachable from the rear of the viewing chamber 30 by means of a standard friction fit or quick-connect mechanical coupling arrangement. The large rectangular descending section of the housing 52 serves as a battery compartment for holding suitable batteries 65 to power the fan assembly 50. Mounted in the rear portion 52 of the housing near the end of the elongated airflow path 6 formed by the nozzle and viewing chamber are a motor 60 and fan 61, the fan being driven by the shaft of the motor 60. The fan 61 rotates to create (when the valve/lens 33 is in the open position) a vacuum that draws air through the front opening 4 of the nozzle 20, along the axis of the housing 11, through the viewing chamber 30, and out the rear of the housing, as shown in the drawings. The vacuum is adjustable by means of a standard motor speed control including a rotatable potentiometer or mufti-position switch 51 and circuit elements mounted on a pc board 63 to allow several distinct speeds or a continuously variable speed for the motor 60. The potentiometer 51 is marked for the user to select on of a high, medium or low speed. In this manner, the vacuum is adjustable by means of the motor speed control to allow gentlest capture with use of slowest speed and aggressive capture at the higher speeds. A trigger 53 is provided to turn the fan motor assembly on and off. The adjustable potentiometer has selectable high, medium and low speed setting. This allows the user of the device to tailor the vacuum to the type of insect of interest.

The child/user of the toy then operates the valve and traps the insect in the chamber 30. The nozzle may then be removed, and the chamber may also be removed from the gun (with screen), resulting in a small package that humanely stores the bug for viewing. In addition to being able to view the bug through the transparent cylindrical walls and screen of the viewing chamber, the valve itself is a magnifying lens that allows even closer detailed viewing of whatever has been captured in the chamber. Vacuum insect capture systems are well know in the prior art, as illustrated in U.S. Pat. Nos. 5,222,322 and 6,226,919, the disclosures of which are incorporated by reference herein. The differences between the fan assembly of this invention and those disclosed in the referenced patents are primarily related to making the assembly disclosed herein more suitable as a toy and an educational device. Thus, small size lightness and small cost of the components have been emphasized.

In operation, when the unit is turned on by engaging the trigger switch 53, the fan assembly 50 turns on the fan and creates a vacuum or negative pressure air stream from the opening 4 in the nozzle 20, through the viewing chamber 30 and exhaust slots 56 at the rear of the unit. A suction is felt all along the air path 6 thru the device. The vacuum thus created pulls insects of interest into and through the nozzle through the open-positioned valve/lens 33 into the viewing chamber 30 where viewing and study of the insect may be done through the lens 33 of the chamber. The chamber may be removed from the nozzle 20 and the fan assembly housing 52 to allow the transport of the insect without the need for these more bulky components. Finally, the insect may be released without physical harm.

Those skilled in the art will recognize that numerous alternatives encompassing many variations may readily be employed without departing from the scope of the present invention as set forth in the claims herein.

What is claimed is:

1. An insect collection and viewing device, the device generally shaped to resemble a pistol, the device further comprising:
   a front end and a back end;
   an insect collection nozzle at said front end and a fan assembly at said back end;
   said fan assembly creating an air flow passing through the device from the nozzle to the back end of the device and creating a vacuum at the nozzle;
   an insect collection chamber removeably connected to said device between said front end and said back end;
   said chamber having opposing ends with one of said opposing ends being open and a remainder of the chamber being sufficiently enclosed to capture insects drawn into the chamber;
   said open end of said chamber being in communication with said air flow whereby insects drawn into said device by said vacuum can pass into said chamber; and
   said chamber having a valve moveable between an open position and a closed position and when in said closed position, said valve encloses the open end of said chamber so that insects captured in said chamber cannot escape, and
   said valve further comprising a magnifying lens operable to permit examination of a captured insect in the insect collection chamber under magnification.

2. The device of claim 1, wherein at least part of the insect collection chamber is a transparent viewing chamber.

3. An insect collection and viewing device, the device generally shaped to resemble a pistol, the device further comprising:
   a fan assembly to generate an air flow from an opening at a first end of the fan assembly and out of an opening at a second end of the fan assembly; and
   an insect collector having
      a downstream opening attachable to the first end of the fan assembly,
      a screen operable to permit air passage but further prevent passage by insects of interest into the fan assembly,
      an upstream opening, whereby upon attachment of the downstream opening to the first end of the fan assembly the air flow generated by the fan assembly passes through the insect collector from the upstream opening to the downstream opening, wherein at least part of the insect collector comprises a transparent viewing chamber, the transparent viewing chamber further comprising:

at least one opening connected to the air flow through the device, a valve moveable to a first position permitting passage of the insects of interest from the insect collector into the transparent viewing chamber and to a second position preventing the insects of interest from exiting the transparent viewing chamber, and wherein the valve further comprises a magnifying lens operable to examine a captured insect in the transparent viewing chamber in a magnified form.

4. The device of claim 3, wherein at least part of the fan assembly is generally shaped to resemble a pistol grip.

5. The device of claim 3, wherein the valve is manually moveable by a user of the device.

6. The device of claim 3, further comprising a nozzle having a first end attachable to the upstream opening of the insect collector and a second end comprising an opening for permitting the air flow through the device upon attachment of the first end of the nozzle to the insect collector.

7. The device of claim 6, wherein the nozzle is interchangeable among a plurality of nozzles having different sized openings in accordance with the various size of the insects of interest.

8. The device of claim 6, wherein the nozzle is attached to the insect collector by mechanical coupling.

9. The device of claim 6, wherein the nozzle is slidably attached to the insect collector.

* * * * *